G. KONIGSTEIN.
KITCHEN IMPLEMENT.
APPLICATION FILED APR. 29, 1908.

928,134.

Patented July 13, 1909.

WITNESSES

INVENTOR
Gabor Konigstein
BY Geo. H. Strong
ATTORNEY

UNITED STATES PATENT OFFICE.

GABOR KONIGSTEIN, OF SAN FRANCISCO, CALIFORNIA, ASSIGNOR OF ONE-THIRD TO SAMUEL J. TAYLOR AND ONE-THIRD TO SAMUEL MAYER, OF OAKLAND, CALIFORNIA.

KITCHEN IMPLEMENT.

No. 928,134.      Specification of Letters Patent.      Patented July 13, 1909.

Application filed April 29, 1908. Serial No. 430,025.

*To all whom it may concern:*

Be it known that I, GABOR KONIGSTEIN, citizen of the United States, residing at the city and county of San Francisco and State of California, have invented new and useful Improvements in Kitchen Implements, of which the following is a specification.

My invention relates to household utensils, and pertains especially to a combination tool or implement readily adaptable for cleaning, paring or peeling vegetables and fruit, opening cans, and other things.

The invention consists of the parts and the construction and combination of parts as hereinafter more fully described and claimed, having reference to the accompanying drawings, in which—

Figure 1:
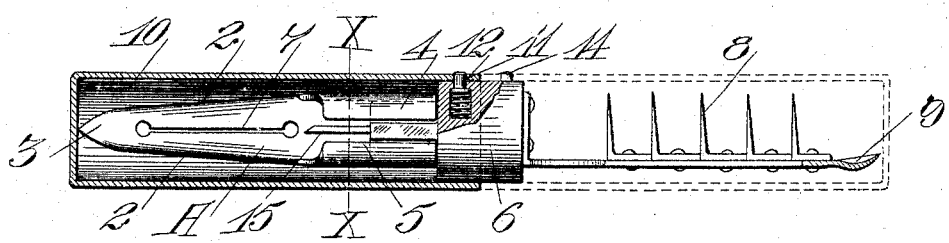
Figure 3:
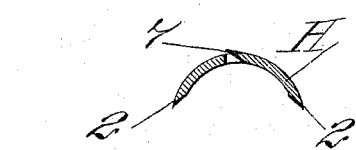
Figure 2:
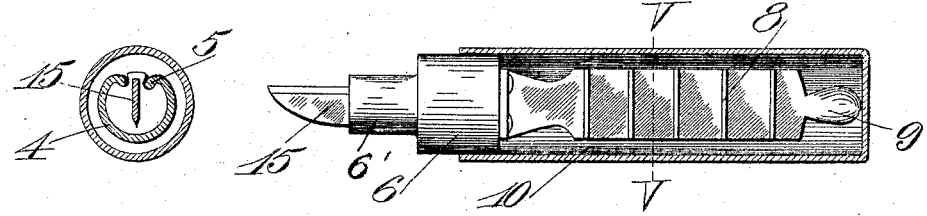
Figure 5:
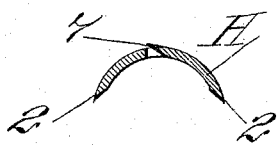
Figure 4:
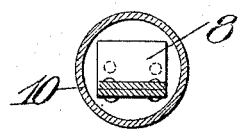

Figure 1 is a side elevation partially in section showing the different implements. Fig. 2 is a similar view showing the paring blade removed. Fig. 3 is a section on line X—X, Fig. 1. Fig. 4 is a section on line V—V, Fig. 2. Fig. 5 is a section of the paring blade.

A is a detachable cylindrical blade having the sharpened curved edges 2 converging to the point 3 of the knife, with the opposite end of the blade forming a base 4 which is partially in the form of a split ring with the ends of the ring inturned to form the locking flanges 5. This base portion of the knife is adapted to slip over a reduced portion $6^1$ formed on a cylindrical block or boss 6 which is grooved lengthwise correspondingly with the inturned locking flanges 5; these flanges and grooves serving to prevent the knife turning on the block, which forms a part of a handle, and securely holding the knife in position. This blade A has a paring edge 7 struck from between its ends and projecting outwardly from the convexed surface of the blade.

Secured to the opposite end of the block 6 is a metallic brush 8, which is of suitable description for use for removing the thin peeling from new potatoes and the like. The bristles of this brush may be of any suitable character; they are herein shown as flat, and they are preferably secured to a metal backing plate, which is suitably fixed to the central supporting block 6. The outer end of this brush may be provided with a pointed, hollowed scoop or digger 9, by which the eyes of potatoes may be dug out, and like useful functions performed.

A detachable tubular cover or cap 10 is adapted to slip over and protect the knife, and form a handle when the brush end of the tool is to be used; this cap being held in place on the central block 6 by suitable means, as the spring pressed button 11, engaging a corresponding perforation 12 in the cap. Likewise, a similar cap may be designed to be slipped over and protect the brush and point 9 when the knife A is to be used; this cap being similarly held on the block by the button 14. Or the one cap 10 may be used, being interchangeable with either end of the device, and forming a handle for whichever end of the device is to be used.

In order to increase the range of usefulness of the tool, the knife A is made detachable by pulling it off of its seat on the block, so as to expose a can-opener blade 15.

All the parts may be made of metal, and very strong and cheap, and can be easily kept clean.

Having thus described my invention, what I claim and desire to secure by Letters Patent is—

1. In a kitchen implement, the combination of a double-ended block, an implement projecting from each end thereof, said block having an extension from one end provided with parallel grooves whereby one of the implements is readily detachable, a hollow handle interchangeable from one end of the block to the other, and detent means carried by the block and adapted to engage with the handle in either of the positions of the latter.

2. In a kitchen implement, the combination with a block, of a blade secured to one end thereof and projecting therefrom, the outer end of said blade being pointed and hollowed out and the portion of the blade between the block and said hollowed out portion being provided with a brush.

In testimony whereof I have hereunto set my hand in presence of two subscribing witnesses.

GABOR KONIGSTEIN.

Witnesses:
   L. H. CONDON,
   T. W. HUBBARD.